Dec. 22, 1942.                M. C. LUMLEY                2,306,023
                              MIRROR MOUNTING
                           Filed Nov. 22, 1940
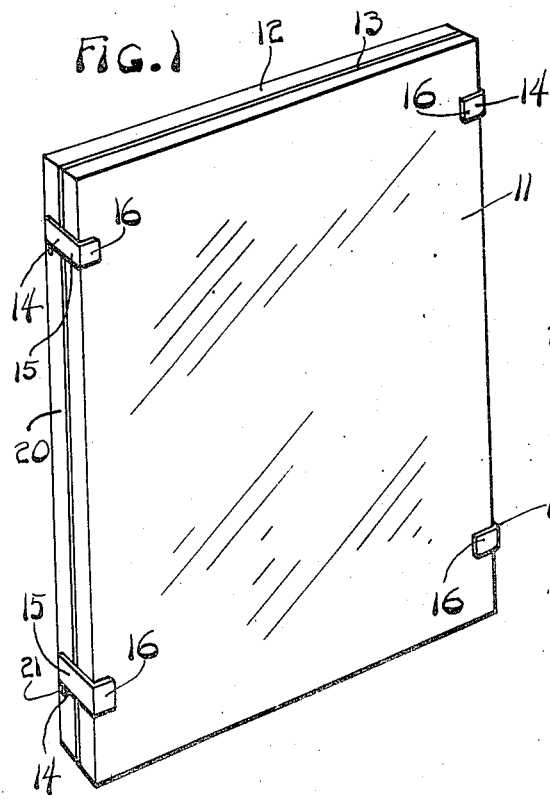
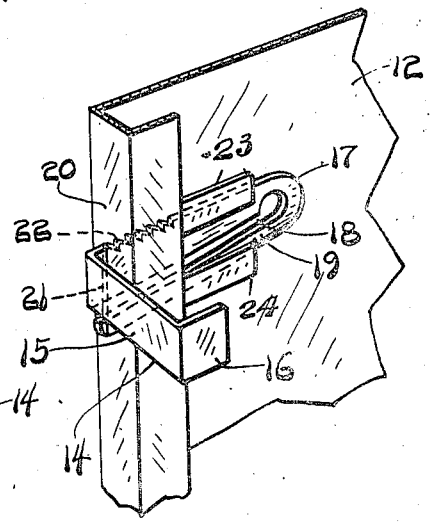
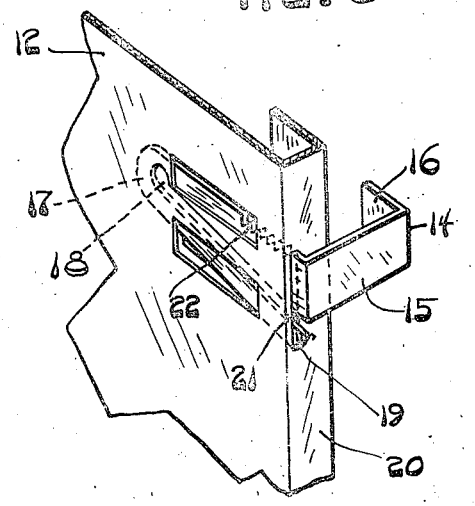
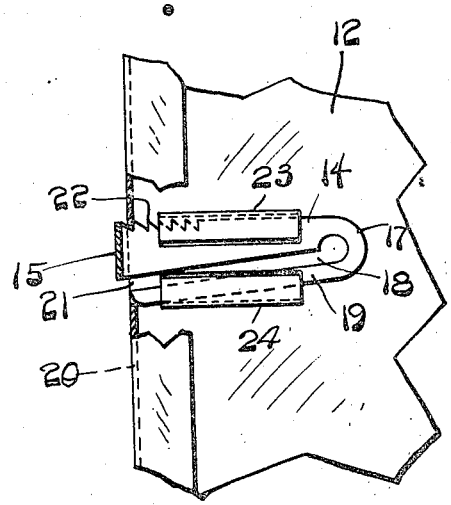
INVENTOR.
Maurice C. Lumley
BY Bogert & Bogert
ATTORNEYS Patented Dec. 22, 1942

2,306,023

UNITED STATES PATENT OFFICE 2,306,023

MIRROR MOUNTING

Maurice C. Lumley, Cincinnati, Ohio, assignor to The F. H. Lawson Company, Cincinnati, Ohio, a corporation of Ohio Application November 22, 1940, Serial No. 366,520

2 Claims. (Cl. 16—1)

The mirror mounting set forth herein is an improvement upon that disclosed in United States Letters Patent No. 2,184,893, which was issued on December 26, 1939, to The F. H. Lawson Company of Cincinnati, Ohio, upon an application filed by me.

Objects of the invention about to be described are to produce such a mirror mounting as incorporates the desirable features of that described in the patent to which I have referred, and which also goes further in that it simplifies manufacturing, eliminates parts and their separate handling and mounting operations, reduces costs, and simplifies the making of repairs and replacements.

These and other objects are attained in the mirror mounting described in the following specification and illustrated in the accompanying drawing, in which:

Fig. 1 is a perspective view of an exemplary mounting of a mirror, incorporating my improved construction.

Fig. 2 is a fragmental perspective view of a portion of the mounting shown in Fig. 1, the mirror having been removed to disclose the construction properly.

Fig. 3 is a view similar to Fig. 2, but showing the back of the structure disclosed in Fig. 2.

Fig. 4 is a fragmental elevational view of the details shown in Figs. 2 and 3, but with certain details broken away for further clarification of the invention now to be described.

Preferred mirror mounting constructions of the type generalized by a mirror 11 which is mounted on a backing or frame 12 with a pad or shock absorbing element of suitable sheet material 13 located between them, incorporate fastening devices 14 therewith, located at suitable intervals, whereby the assembly of mirror, pad and frame, is made a unit. Such fastening devices conveniently and most satisfactorily may consist of angular clips which extend over the edges of the mirror and in partial engagement with its face adjacent to the edges, sufficiently to hold it in place against displacement.

Exemplary clip formation to which this invention relates, consists of a simple U-shape strip of flat metal having a base 15 from which a short front finger 16 extends for gripping engagement with the mirror face, with a cooperating back finger 17 which is the principal agency by means of which the clip functions. This back finger is of unique construction in that it comprises both the ratchet and yielding element of a pawl and ratchet construction of reversed relationship and function as compared with conventional pawl and ratchet design practice. Its manner of mounting in the frame 12, and its relationship thereto in the utilization of the frame as a pawl, additionally set up features of novelty which are developed in this description.

Reference to the drawing discloses the back finger 17 of the clip 14 as having a tapering shape, a slot 18 being formed therein at an angle, whereby a spring finger 19 is formed as an integral part of the clip. The side wall 20 of the backing 12 is provided with a slot 21 through which the clip is pressed, with the finger 19 bearing against the lower end of the slot, whereby notches 22 in the upper edge of the clip engage the upper end of the slot 21, the notches being inclined so as to permit the clip being pressed into position and to retain it against displacement. As guides for the clip finger 17 I have cut the back 12 of the mirror mounting so as to permit of flanges 23 and 24 being bent inwardly therefrom to provide guides which form a way for the clip finger, within which it may slide in alignment with the entering slot 21 and to afford a bearing for the spring finger 19.

In the utilization of the improved construction which I have shown and described above, it is obvious that with suitable cushion-like backing 13 for the mirror 11, mere placement of these elements on the back 12, permits the clips 14 to be pressed into place as shown, thereby retaining the assembly in condition as a unit, as shown in Fig. 1. The ratchet teeth of the clips, cooperating with the wall 20 at the upper end of the slot 21, will lock the clips in place. However, to remove the mirror it is but necessary to press downwardly on each clip at its base 15, thereby removing the ratchet teeth from engagement with the wall 20 and permitting clip removal.

Having thus described my invention what I claim is:

1. A clip for securing a mirror to a backing, consisting of a metal strip having a short rigid finger adapted to grip the mirror face adjacent to its edge and having a rigid notched back finger adapted to grip the backing, said back finger tapering into and terminating in a spring finger, said spring finger extending in reverse direction in substantial alignment with the taper of the back finger, and spaced therefrom.

2. A clip for securing a mirror to a backing, consisting of a substantially U-shaped metal strip having one leg thereof consisting of a short rigid finger adapted with the base of the U to grip the mirror edge and face adjacent thereto, the other leg of the U consisting of a longer rigid finger notched on one edge to lock on the backing, tapering into and terminating in a spring finger, said spring finger extending in reverse direction in substantial alignment with the taper of the back finger, spaced therefrom and opposed to the notched edge of the longer rigid finger.

MAURICE C. LUMLEY.